(12) United States Patent
Feaviour et al.

(10) Patent No.: US 7,972,394 B2
(45) Date of Patent: Jul. 5, 2011

(54) SELECTIVE METHANATION REACTOR FOR REDUCING CARBON MONOXIDE IN A REFORMATE STREAM

(75) Inventors: Mark Robert Feaviour, Reading (GB); Julia Margaret Rowe, Oxon (GB)

(73) Assignee: GM Global Technology Operations LLC, Detroit, MI (US)

( * ) Notice: Subject to any disclaimer, the term of this patent is extended or adjusted under 35 U.S.C. 154(b) by 284 days.

(21) Appl. No.: 11/502,860

(22) Filed: Aug. 11, 2006

(65) Prior Publication Data

US 2006/0272213 A1 Dec. 7, 2006

Related U.S. Application Data

(62) Division of application No. 10/382,446, filed on Mar. 6, 2003, now abandoned.

(51) Int. Cl.
*C10J 3/46* (2006.01)
*C10B 3/23* (2006.01)

(52) U.S. Cl. .................. 48/197 R; 48/95; 48/93; 48/94; 48/61; 48/198.3; 48/198.7; 48/214 R; 48/215; 423/650; 423/651; 423/652; 423/653; 423/654; 423/656; 502/64; 429/19; 429/20; 422/190; 422/211; 422/187

(58) Field of Classification Search ................ 48/197 R, 48/95; 502/64; 429/19; 423/650–656
See application file for complete search history.

(56) References Cited

U.S. PATENT DOCUMENTS

| 3,518,206 A * | 6/1970 | Stiles et. al. ................. 502/64 |
| 3,615,164 A | 10/1971 | Baker et al. |
| 3,873,469 A | 3/1975 | Foster et al. |
| 5,248,566 A * | 9/1993 | Kumar et al. .................. 429/19 |
| 5,874,051 A | 2/1999 | Heil et al. |
| 5,904,913 A | 5/1999 | Bohm et al. |
| 6,207,307 B1 | 3/2001 | Van Keulen |
| 6,403,049 B1 * | 6/2002 | Van Keulen et al. .......... 423/247 |
| 6,409,974 B1 | 6/2002 | Towler et al. |
| 6,429,167 B1 | 8/2002 | Maeno et al. |
| 7,118,717 B2 | 10/2006 | Shore |
| 2003/0007926 A1 | 1/2003 | Jiang et al. |
| 2003/0051405 A1 | 3/2003 | Childress et al. |
| 2003/0230029 A1 | 12/2003 | Ruettinger et al. |
| 2003/0230443 A1 | 12/2003 | Cramer et al. |
| 2004/0048114 A1 | 3/2004 | Shore |

FOREIGN PATENT DOCUMENTS

WO     WO 2004/022481 A1     8/2003

OTHER PUBLICATIONS

Daniell, et al. "Enhanced Surface Acidity in Mixed Alumina-Silicas: A Low-Temperature FTIR Study", 2000, pp. 246-260, Elsvier Science B.V.
Ertl et al., "Environmental Catalysis—Mobile Sources", Handbook of Heterogeneous Catalysis, pp. 1575-1582, vol. 4, VCH A Wiley Company.

* cited by examiner

*Primary Examiner* — Kaity V. Handal
(74) *Attorney, Agent, or Firm* — Dinsmore & Shohl LLP (57) ABSTRACT

A method of operating a methanation reactor to reduce carbon monoxide concentration in a reformate stream in a fuel cell reformer. The reactor includes a flowpath with a noble metal catalyst supported by a ceramic support such that the reactor preferentially converts carbon monoxide via methanation over that of carbon dioxide. The reduced level of carbon monoxide present in the reformate stream after passing through the methanation reactor reduces the likelihood of poisoning of the catalyst used on the fuel cell anode.

13 Claims, 5 Drawing Sheets

SELECTIVE METHANATION REACTOR FOR REDUCING CARBON MONOXIDE IN A REFORMATE STREAM

CROSS REFERENCE TO RELATED APPLICATIONS

This application is a divisional of application Ser. No. 10/382,446, filed Mar. 6, 2003, now abandoned.

BACKGROUND OF THE INVENTION

The present invention relates generally to a device for purifying feedstock to be used in fuel cells, and more particularly to material and configuration improvements in a methanation reactor to facilitate carbon monoxide removal from a reformate stream.

While conventional power source devices (such as internal combustion engines, including piston and gas turbine-based platforms) are well-known as ways to produce, among other things, motive, heat and electric power, recent concerns about the effects they and their fuel sources have on the environment have led to the development of alternative means of producing such power. The interest in fuel cells is in response to these and other concerns. One form of fuel cell, called the proton exchange membrane (PEM) fuel cell, has shown particular promise for vehicular and related mobile applications. A typical PEM construction includes an anode and a cathode, with a solid polymer electrolyte membrane spaced between them such that protons generated at the anode can travel through the electrolyte and to the cathode. In PEM fuel cells, hydrogen or a hydrogen-rich gas is supplied to the anode side of a fuel cell while oxygen (such as in the form of atmospheric oxygen) is supplied to the cathode side of the fuel cell. Catalysts, typically in the form of a noble metal (such as platinum), are placed at the anode and cathode to facilitate the ionization of hydrogen and subsequent reaction between it and oxygen.

In an ideal fuel supply situation, pure hydrogen ($H_2$) gas is used as a direct fuel source. This is impractical in many vehicle-based fuel cell systems, as the amount of gaseous hydrogen required to be carried in order to achieve adequate vehicle range between refueling stops would be prohibitively large. A promising alternative to the direct feeding of $H_2$ is the reformation of on-board liquid hydrocarbons through a fuel processing system upstream of the fuel cell such that the liquid hydrocarbons are converted into $H_2$-rich feedstock. Methanol ($CH_3OH$) is an example of a readily-available hydrocarbon fuel, and accordingly has become one of the preferred $H_2$ precursors, especially for volume-constrained mobile fuel cell applications. Its relative low cost and liquid state at practical temperatures of interest make it compatible with existing fuel delivery infrastructure. Unfortunately, during the conversion of $CH_3OH$ to $H_2$, carbon monoxide (CO) is also produced, of which even minute amounts can poison the noble metal catalyst on the downstream fuel cell anode and cathode. While reformation of $CH_3OH$ often produces only small amounts of CO, even such small quantities have a deleterious effect on fuel cell power output and life. Hence, the CO concentration needs to be attenuated to very low levels (preferably below 10 ppm) for the $H_2$-rich reformate to be suitable as fuel cell feedstock.

A typical fuel processing system incorporating $CH_3OH$ includes a reformer and one or more purification (or clean-up) stages. There have emerged three general types of reformers that can be used on $CH_3OH$ and related liquid hydrocarbons: (1) steam reforming; (2) partial oxidation reforming; and (3) autothermal reforming. In the first variant, a pre-heated mixture of fuel and steam is reacted, while in the second variant, a pre-heated mixture of fuel and air is reacted. The third variant combines elements of both processes in a single reactor, and using a specially designed catalyst, enables balancing of the endothermic first and exothermic second variants. In all three cases, a reformate containing the desired end product, gaseous $H_2$, as well as undesirable CO, is produced. A shift reactor may be employed to convert the CO in the reformate with water into $CO_2$ and $H_2$ in what is called a water-gas shift reaction. Since the water-gas shift reaction is reversible, it has been found that to promote the formation of $CO_2$ and $H_2$, the reformate should be cooled. Serially connected shift reactors of successively lower temperatures may be used to further reduce the CO concentration. While this level of CO cleanup could be sufficient for certain types of fuel cells, it is still not adequate for others, such as PEM fuel cells. While much of the present disclosure is in the context of PEM fuel cells, it will be appreciated by those skilled in the art that the invention disclosed herein has utility in other forms of fuel cells, where clean-up of fuel precursors can be used for improved fuel cell system operability, as well as for other processes where highly purified $H_2$ feedstock is necessary. Accordingly, at least for PEM fuel cells, additional steps must be taken to ensure that the concentration of CO in the reformate is further reduced. There are numerous ways to provide such reduction, including preferential oxidation of CO, the use of diffusion membranes to separate $H_2$ from the CO, and catalytic methanation reactions. Often, two or more of these methods can be used in combination to achieve the exceptionally low CO concentrations necessary for proper PEM operation. Of these, the methanation reaction is achieved by reacting CO with some of the just-produced $H_2$, typically in the presence of a catalyst, to produce methane ($CH_4$) and water according to the following:

$$CO+3H_2 \rightarrow CH_4+H_2O \qquad (1)$$

Typically, the reformate stream contains (in addition to the CO) other by-products, most notably $CO_2$. Accordingly, methanation reaction (1) above must compete with the following:

$$CO_2+4H_2 \rightarrow CH_4+2H_2O. \qquad (2)$$

Typical reformate streams, including those produced by the reformation of $CH_3OH$, can possess considerably higher concentrations of $CO_2$ than CO, often more than an order of magnitude higher. As a potential methanation reaction, reaction (2) is particularly undesirable because, given the relatively high concentration of $CO_2$ in a $CH_3OH$ reformate stream, it rapidly reduces the amount of $H_2$ available to the fuel cell anode (by consuming four $H_2$ molecules for every $CO_2$ molecule), thereby leaving the lower concentration and more poisonous CO relatively unreacted. In addition, if the concentration of $CO_2$ is relatively high (on the order of a percent or more), the strong affinity for $H_2$ cuts into the available $H_2$ fuel supply, significantly reducing fuel efficiency. Thus, to minimize both $H_2$ losses and the presence of poisons being delivered to the fuel cell anode, methanation reactions should be used when the concentration of both of the aforementioned carbon oxides is relatively low. Such a situation is most readily achieved when the methantion reactor works in conjunction with one or more of the previously indicated other clean-up devices.

One way to promote the reaction (1) to the exclusion (or near exclusion) of reaction (2) is to employ some means for selective methanation. Selective methanation involves the preferential reaction of one reactant species in lieu of others when others are also present. In the present case, it is desirable to achieve the selective methanation of CO over $CO_2$ to remove the more harmful former from the reformate stream that will eventually find its way to the fuel cell anode. Previous attempts at selective methanation of CO over $CO_2$ have proven to be too difficult, and hence expensive, to be viable for large-scale commercial use. One reason is that the disproportionate concentration of $CO_2$ to CO, in addition to leading to the aforementioned inordinate consumption of $H_2$, also leaves some of the CO unreacted. While some of this preferential reaction with $CO_2$ can be meliorated with proper methanation catalyst choice, such choices are limited because of the second reason: both reactions (1) and (2) are exothermic (heat-producing) in nature, thereby producing higher temperatures in the region around the methanation catalyst. These high temperatures remove from consideration the relatively limited number of catalysts (for example, rhodium and ruthenium) that are good at promoting selective methanation of CO over $CO_2$, as these catalyst function best at low temperatures. In addition, high methanation temperatures can facilitate the aforementioned reverse water gas shift reaction, which by producing more CO, is undesirable. Supplemental thermal management schemes, such as intrusive heat exchangers and coolant injection can be used, but such schemes increase system weight, volume, cost and complexity, especially those which are untenable in configuration where space and weight come at a premium, such as in vehicular and related mobile applications. On the other hand, the temperature must also be high enough to promote adequate levels of methanation activity. This is important, as CO conversion (i.e., activity) is strongly temperature-dependent, where higher temperature regimes tend to promote CO methanation better than lower temperature regimes. Accordingly, existing methanation reactors, typically with the aforementioned rhodium or ruthenium catalysts on an alumina ($Al_2O_3$) support, are neither sufficiently reactive at lower temperatures nor sufficiently selective at higher temperatures to maximize conversion of CO to $CH_4$.

Accordingly, there exists a need for a methantion reactor that can achieve selective methanation of CO over $CO_2$ (and other competing species) without having to resort to approaches that require significant increases in weight, volume or complexity. There also exists a need for a methanation reactor that is compatible with other reformate stream CO reduction approaches.

BRIEF SUMMARY OF THE INVENTION

These needs are met by the present invention, wherein a methanation reactor with improved features is disclosed. According to a first aspect of the invention, a methanation reactor includes a rhodium-based catalyst disposed on a silica ($SiO_2$)-coated $Al_2O_3$ support.

According to another aspect of the invention, a device comprising a methanation reactor is disclosed. The methanation reactor includes a porous ceramic support defining a surface acidity, a coating configured to increase the surface acidity, a noble metal catalyst coupled to at least one of the support or the coating, and a flowpath configured to place the reformate stream in fluid communication with at least the noble metal catalyst such that carbon monoxide conversion in the reactor is greater than if the coating were not present. In the present context, two components are "coupled" when through their cooperation they effect a common purpose, even absent direct connection between the two. Thus, the noble metal catalyst is considered "coupled" to the support, even if through a layer of the silica coating, so long as the structure of the catalyst and support cooperate to facilitate the methanation of the carbon monoxide.

Optionally, the reactor is configured to operate in a temperature regime such that selectivity for carbon monoxide in the reactor is at least 70 percent while conversion of carbon monoxide is at least about 1200 ppm. More particularly, the reactor is configured to operate in a temperature regime such that the selectivity is at least 80 percent and conversion of carbon monoxide is at least about 1200 ppm. Preferably, the noble metal is rhodium, which can exist in a concentration of up to approximately two percent, and more particularly approximately one percent. Moreover, the support is preferably $Al_2O_3$, while the coating is $SiO_2$. As an alternative to rhodium, the noble metal could be ruthenium. The device additionally comprises a reformer configured to convert raw fuel into the reformate stream. More particularly, the device additionally comprises a fuel supply and an oxygen supply, and a fuel cell configured to receive a hydrogen-rich portion of the reformate stream that has passed through the reactor. Preferably, the fuel cell is a PEM fuel cell. Furthermore, the device preferably comprises a vehicle (which could be for example, a car, truck, aircraft, spacecraft, watercraft or motorcycle) such that the fuel cell is a source of motive power. The source of motive power may provide direct or indirect propulsive force, the latter through (by way of example) a mechanical coupling to one or more wheels or fluid-engaging means, such as a propeller. Particularly, the vehicle comprises a platform configured to carry the source of motive power, a drivetrain rotatably responsive to output from the source of motive power, and a plurality of wheels connected to the drivetrain. The device may further comprise one or both of a preferential oxidation system or palladium-based permeation membrane placed in fluid communication with the reactor, thereby effecting addition carbon monoxide removal from the reformate stream.

According to still another aspect of the invention, a methanation reactor for the removal of carbon monoxide from a reformate stream is disclosed. The methanation reactor comprises a ceramic support, a noble metal catalyst coupled to the support and a flowpath configured to place the reformate stream in fluid communication with at least the noble metal catalyst. The support, noble metal catalyst and the flowpath are configured such that while operating in a temperature regime not in excess of 260 degrees Celsius, selectivity for carbon monoxide in the reactor is at least approximately 60 percent. Preferably, the ceramic is zirconia, while the noble metal comprises rhodium or ruthenium.

According to another aspect of the invention, a method of delivering fuel to a fuel cell system is disclosed. The method comprises the steps of configuring a fuel delivery system to include a fuel supply and oxygen supply, fluidly connecting a fuel processing system to the fuel delivery system, introducing fuel and oxygen to create a fuel-oxygen mixture, heating the fuel-oxygen mixture in a reformer such that a reformate stream is produced, purifying the reformate stream in a methanation reactor and transporting a hydrogen-rich portion of the reformate stream to a fuel cell. The fuel processing system comprises the reformer to evaporate a mixture of fuel and oxygen coming from the fuel delivery system and the methanation reactor, the latter for the removal of carbon monoxide from the reformate stream produced by the reformer. The reactor is similar in configuration to at least one of the ones discussed in the previous aspects. Optionally, the reactor is configured to operate in a temperature regime such that selectivity for carbon monoxide in the reactor is at least 70 percent while conversion of carbon monoxide is at least about 1200 ppm. Preferably, the noble metal is rhodium, while the support is $Al_2O_3$ and the coating is $SiO_2$.

According to yet another aspect of the invention, a method of purifying a $CH_3OH$ reformate stream is disclosed. The method includes configuring a reformer to evaporate a mixture of fuel and oxygen, the evaporated mixture defining the reformate stream; fluidly connecting a methanation reactor to the reformer for the removal of carbon monoxide from the reformate stream, the reactor comprising: a porous ceramic support defining a surface acidity; a coating configured to increase the surface acidity; a noble metal catalyst coupled to at least one of the support or the coating; and a flowpath configured to place the reformate stream in fluid communication with at least the noble metal catalyst such that carbon monoxide conversion in the reactor is greater than if the coating were not present; evaporating the mixture of fuel and oxygen such that the reformate stream is produced; and exposing at least a portion of the reformate stream to the reactor such that at least a portion of carbon monoxide is removed from the reformate stream.

BRIEF DESCRIPTION OF THE SEVERAL VIEWS OF THE DRAWINGS

The following detailed description of the present invention can be best understood when read in conjunction with the following drawings, where like structure is indicated with like reference numerals and in which.

DETAILED DESCRIPTION

Figure 1:
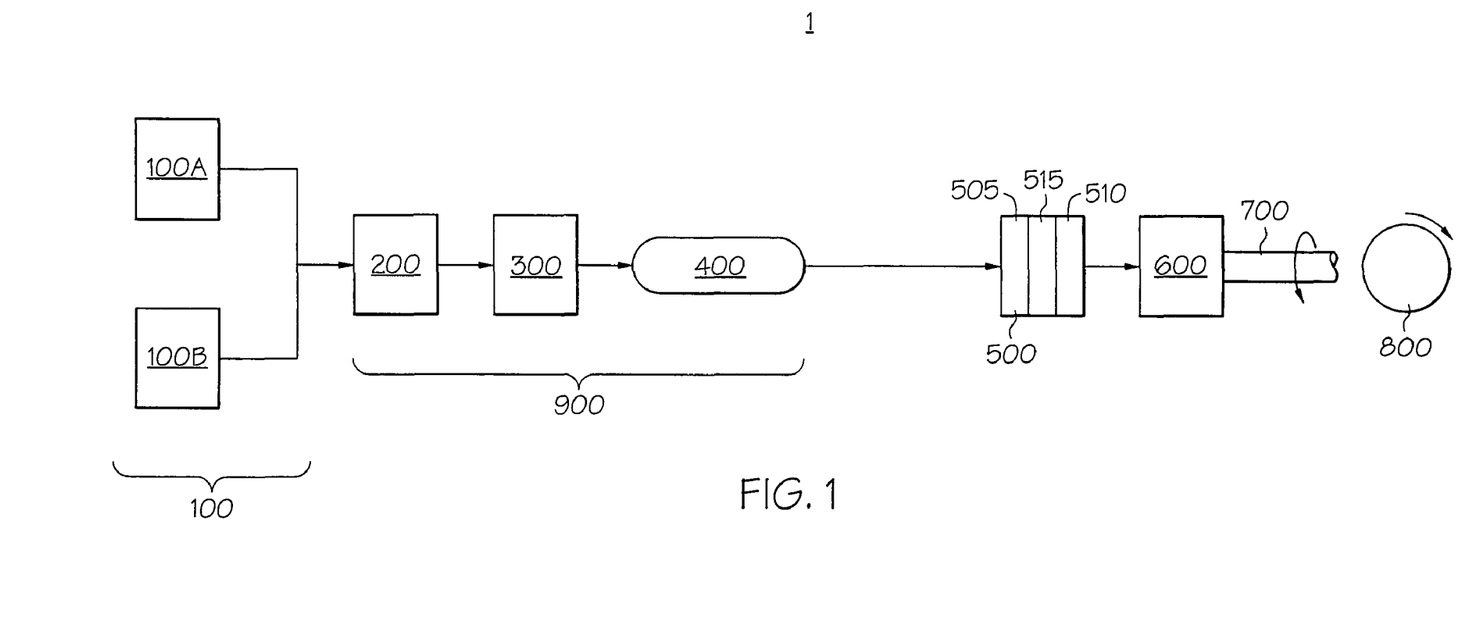
FIG. 1 shows a block diagram of a generalized mobile fuel cell system, including a fuel processing subsystem embodying the present invention.

Referring initially to FIG. 1, a block diagram highlights the major components of a mobile fuel cell system 1 according to the present invention. The system includes a fuel delivery system 100 (made up of fuel supply 100A and oxygen supply 100B), reformer 200, supplemental CO clean-up device 300, methanation reactor 400 for cleaning up reformate coming out of supplemental CO clean-up device 300, fuel cell 500, one or more energy storage devices 600, a drivetrain 700 and one or more wheels 800. Together, reformer 200, supplemental CO clean-up device 300 and methanation reactor 400 make up fuel processing system 900. While the present system 1 is shown for mobile (such as vehicular) applications, it will be appreciated by those skilled in the art that the use of the fuel cell 500 and its ancillary equipment is equally applicable to stationary applications. The energy storage devices 600 can be in the form of one or more batteries, capacitors, electricity converters, or even a motor to convert the electric current coming from the fuel cell 500 into mechanical power such as rotating shaft power that can be used to operate drivetrain 700 and wheels 800. The fuel supply 100A takes a raw fuel, such as $CH_3OH$, and after combining it with an oxidant, such as oxygen from oxygen supply 100B, sends the mixture to reformer 200, where the mixture is converted to $H_2$ fuel and various byproducts in the following reactions:

$$CH_3OH+H_2O \rightarrow 3H_2+CO_2$$

$$CH_3OH+1.5O_2 \rightarrow 2H_2O+CO_2$$

$$CH_3OH \rightarrow 2H_2+CO$$

The last of these reactions is a $CH_3OH$ decomposition reaction, and produces CO. Since many of the aforementioned reactions are reversible, heat exchangers (not shown) can be added in one or more of the locations to create temperature regimes in the reformate flowpath that will facilitate the reaction in the direction most beneficial to the fuel cell system 1. Similar heat exchangers may be installed to protect the various catalysts in the fuel cell 500 from damage due to excessive heat. By way of example, a set of heat exchangers can be disposed between the reformer 200, the supplemental CO clean-up device 300 and the methanation reactor 400 to promote various reactions, such as the water-gas shift reaction shown by the following formula:

$$CO+H_2O \rightarrow CO_2+H_2.$$

The water-gas shift reaction takes place in a shift reactor and, under the proper temperature, pressure, steam ratio and reformate composition, can proceed in the direction shown to reduce the concentration of CO in the reformate stream, as well as to increase the $H_2$ yield. If the environmental temperature surrounding the CO, $H_2O$, $CO_2$ and $H_2$ is too high, the reaction (which is reversible) will favor the formation of the products on the left-hand side of the above equation, in what is termed the reverse water-gas shift reaction. Since CO acts as a poison to the catalysts in fuel cell 500, it is desirable to avoid operating in temperature regimes that facilitate reverse water gas shift reaction formation. Accordingly, to promote the reaction in the direction shown above, temperatures should be kept fairly low.

In any event, some of the various by-products, if left untreated, would be in far too great a concentration for long-term viability of the fuel cell 500. When the fuel cell 500 is configured as a PEM fuel cell, which typically includes a polymer membrane 515 disposed between an anode 505 and cathode 515, both of which can be coated with a platinum catalyst adjacent the membrane 515, the most notable poison from the reformation reactions is the CO produced in the $CH_3OH$ decomposition reaction, which preferentially reacts with and consumes the platinum. The design of a properly-functioning system that attempts to exploit both a water-gas shift reaction and a methanation catalyst produces a tension between having a high enough temperature to promote the methanation of CO while simultaneously being below that conducive for the formation of the reverse shift reaction. This bifurcated requirement, by limiting the temperature range over which the system operates, places restrictions on the class of potential catalysts in the methanation reactor. Once within the temperature range conducive for methanation, further striations are encouraged to promote the selective methanation of CO over $CO_2$.

Figure 3:
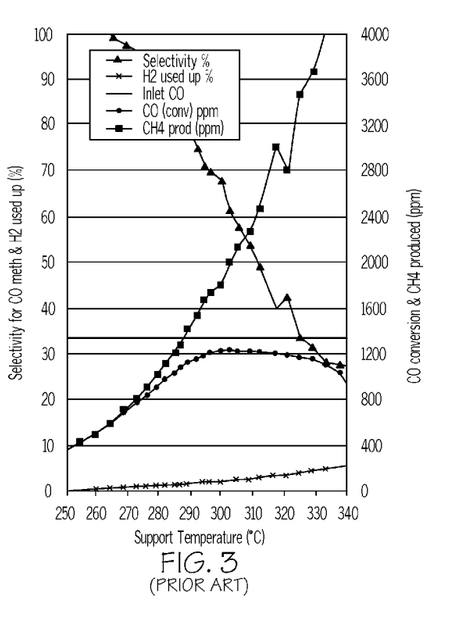
FIG. 3 shows a graph representative of CO selectivity, $H_2$ consumption and CO conversion according to the prior art.

Referring next to FIG. 3, the results of a prior art methanation reactor are shown. The catalyst is rhodium-based, while the support is made from $Al_2O_3$. The graph indicates that the selectivity of this particular catalyst-support combination for CO is very temperature-dependent, going from virtually one hundred percent at approximately 265 degrees Celsius to about twenty five percent at approximately 340 degrees Celsius. Such dependency makes it difficult to integrate the methantion reactor with other CO clean-up devices, as the temperature environment they operate in may be dramatically different than that of the methanation reactor. In order to ensure proper temperature regimes for each device, supplemental thermal management schemes (such as controlled feed inlet temperatures or the aforementioned heat exchangers) must be adopted, adding complexity to the system. As can be seen from the graph, since the preferential selectivity of CO over $CO_2$ is higher at low temperatures, it is important to operate a selective methanation reactor at the lower end of the temperature spectrum to keep $CO_2$ methanation in check. Unfortunately, the lower temperatures also inhibit CO conversion in the methanation reaction, as the conversion rate is below ten percent about 400 ppm at 250 degrees Celsius, and doesn't approach thirty percent about 1200 ppm until almost 300 degrees Celsius. This relatively narrow operating window makes it more difficult to design a fuel processing system that can react away the existing CO without forming more under the reverse water gas shift reaction or consuming an inordinate amount of hydrogen in the process.

Figure 2:
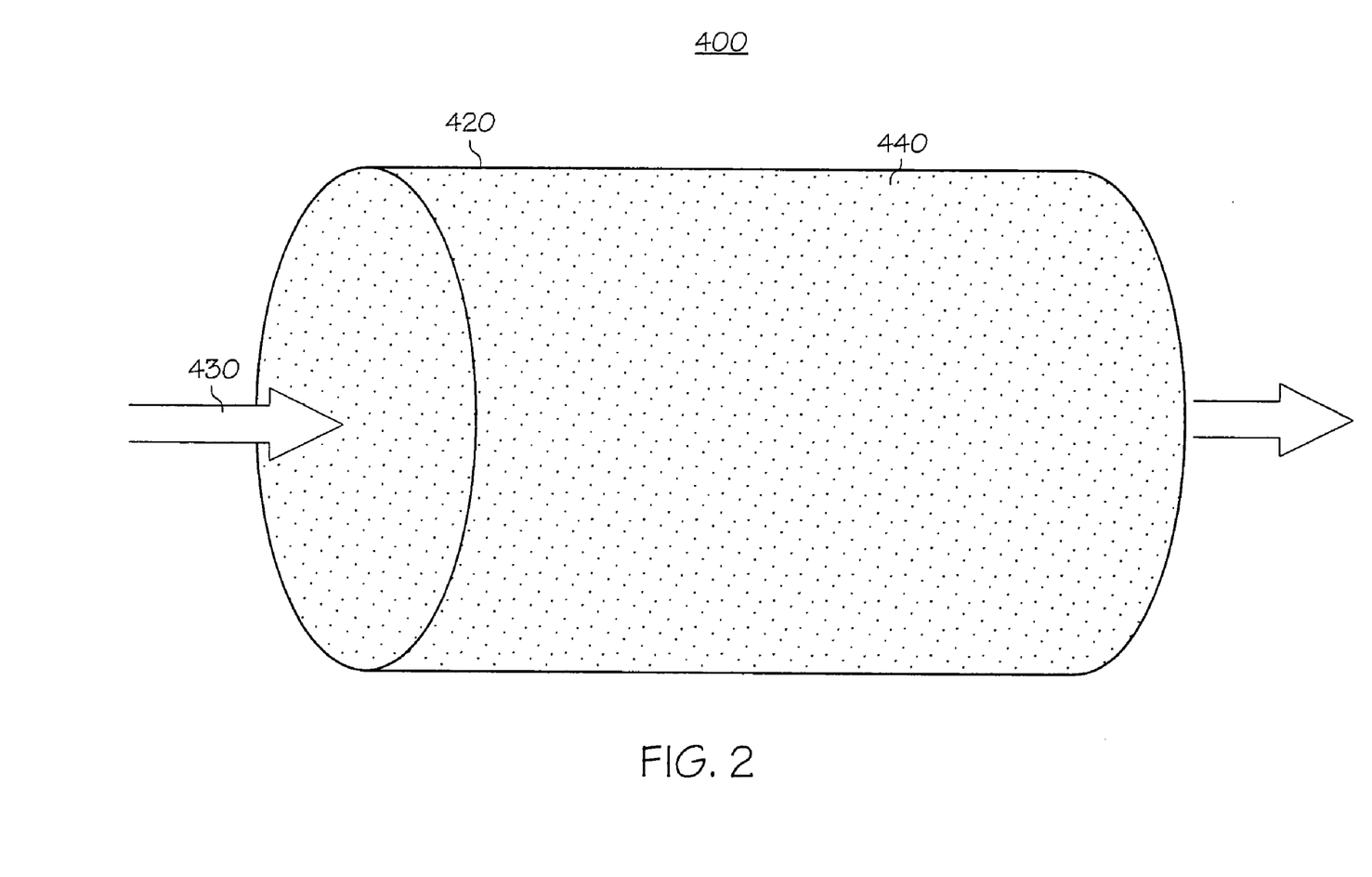
FIG. 2 shows a simplified methanation reactor according the present invention.
Figure 6:
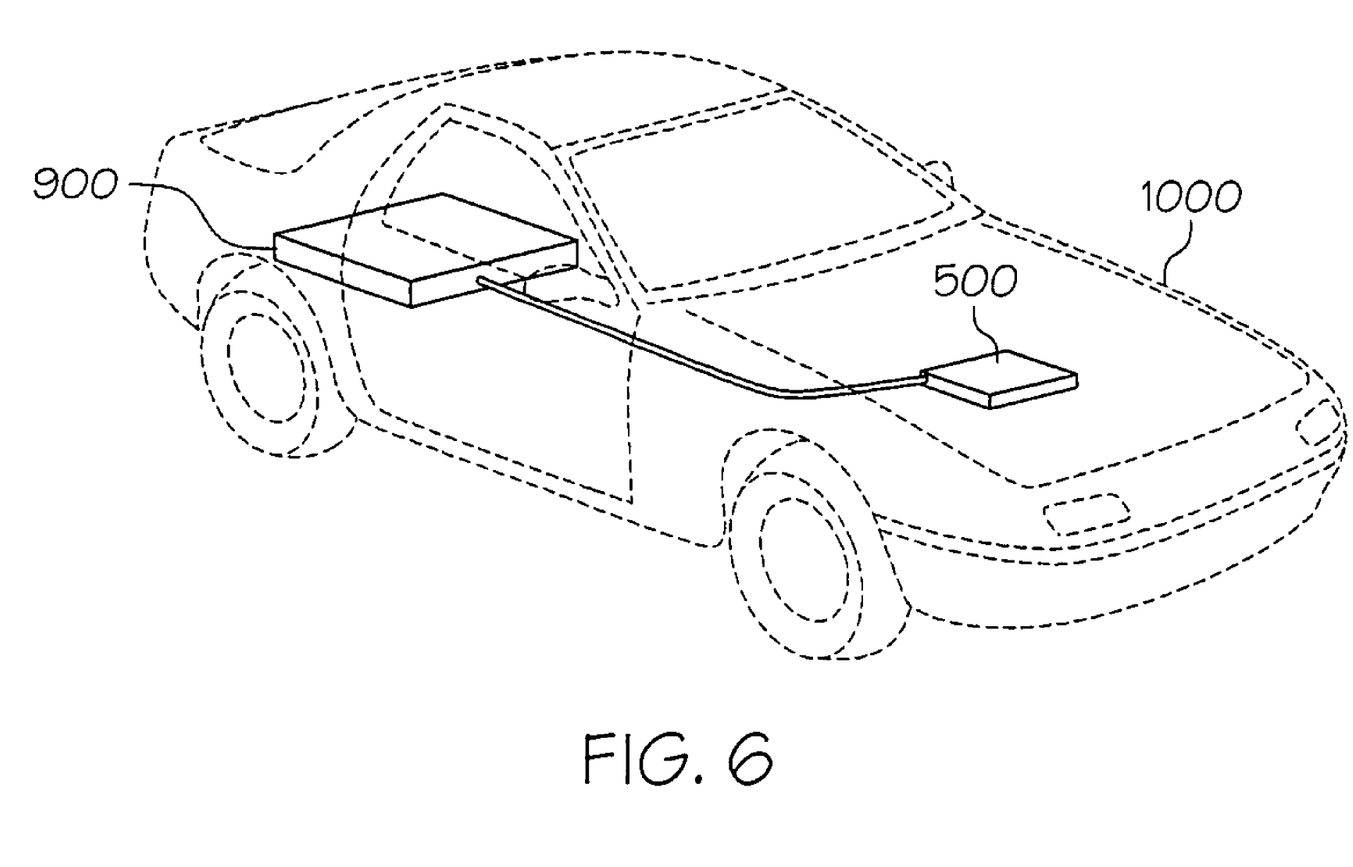
FIG. 6 shows the placement of a fuel cell, as well as a fuel processing system containing a methanation reactor according to an aspect of the present invention into a vehicle.

Referring next to FIGS. 2 and 6, a simplified methanation reactor 400 according to an aspect of the present invention, and an exemplary placement of a fuel processing system 900 incorporating the reactor 400 in a vehicle 1000, is shown. It will be appreciated by those skilled in the art that, depending on the allowable cost and CO reduction requirements, additional components can be coupled to methanation reactor 400 to further reduce the CO levels in the reformate. For example, a preferential oxidation reactor (not shown) can be incorporated to react small quantities of oxygen with the carbon monoxide in the presence of an oxidation catalyst to convert the carbon monoxide into carbon dioxide, all the while keeping the amount of $H_2$ that reacts with the oxygen to a minimum. Another component, in the form of a permeation device (such as a palladium-based membrane, not shown), allows only hydrogen to permeate through, thereby removing unwanted carbon oxides from the permeate.

The major components of the reactor 400 include a ceramic support 420 that defines a flowpath 430 therethrough and a noble metal catalyst 440. While the support 420 is shown notionally as a solid cylindrical rod, it will be appreciated by those skilled in the art that other configurations, including tubular and planar supports (neither of which are shown) could be employed. Similarly, while the flowpath 430 is shown as extending axially through the reactor 400, it will be appreciated that it could also flow radially (either inward or outward, especially if the reactor 400 is tubular). The preferred noble metal for the catalyst is rhodium or ruthenium, either of which facilitate high selectivity for CO at relatively low temperatures. This low temperature performance is important in methanation reactors, as the reactor often cooperates with other devices, such as one or more supplemental CO clean-up device 300 (which could be in the form of a diffusion membrane or selective oxidation reactor, among others) to achieve very aggressive CO reduction goals. In addition, by operating in a lower temperature regime, the danger of promoting the aforementioned reverse water gas shift reaction is reduced. Configurationally, the catalyst 440 can be deposited directly onto the support 420, or through a carrier (not shown). The combination of the support 420 and the catalyst 440 can be effected numerous ways. For example, a rhodium solution can be used to impregnate the porous ceramic of the support 420, then dried and reduced to yield a loaded rhodium reactor 400. Impregnation is one particularly suitable technique for depositing the catalyst 440 on the support 420, and includes bringing a rhodium or ruthenium based solution into contact with the support 420, after which the reactor 400 is dried and calcined. Alternatively the catalyst 440 can be applied as part of a ceramic-based washcoat (not shown), such that the catalyst 440 is supported on or dispersed within the washcoat, which is in turn deposited on the ceramic support 420.

While $Al_2O_3$ has been the ceramic material of choice for methanation reactors according to the prior art, the present inventors have discovered that by adding $SiO_2$ to the $Al_2O_3$ support 420 improved selectivity and higher CO conversion rates at more compatible temperature regimes result. It will be appreciated that the addition of $SiO_2$ to the $Al_2O_3$ support of the present invention is not the same as an aluminosilicate ($Al_2O_3SiO_2$) support, where in the latter, both $Al_2O_3$ and $SiO_2$ are present in the precursor material in a predetermined ratio. The configuration of the present support is such that the $SiO_2$ is dispersed over the surface of the $Al_2O_3$ to increase the acidity of the surface. The increase in surface acidity appears to increase CO activity, thus promoting more active CO methanation than pure $Al_2O_3$. The concentration of added $SiO_2$ (for improved acidity) has to be balanced against the superior catalyst coatability of $Al_2O_3$. The coated support configuration disclosed herein is beneficial, in that by improving the activity of the CO coming into contact with the catalyst, the temperature window over which the methanation reaction remains viable can be made larger. This allows the otherwise stringent temperature controls associated with the prior art devices to be relaxed, resulting in a simpler, lower-cost fuel processing system 900.

Figure 4:
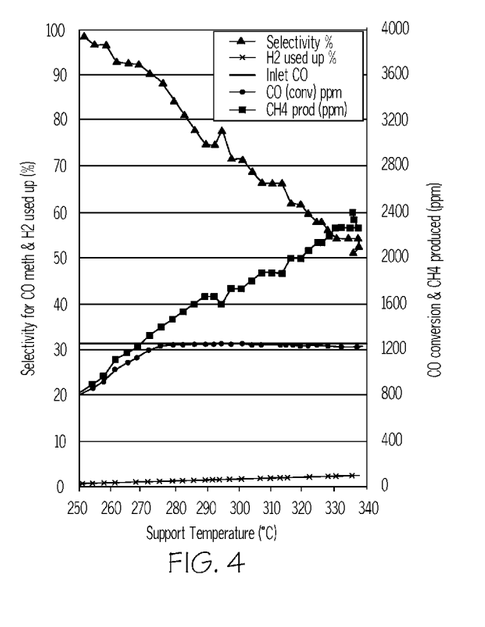
FIG. 4 shows a graph representative of CO selectivity, $H_2$ consumption and CO conversion according to an embodiment of the present invention.

Referring next to FIG. 4, the results of methanation reactor 400 according to an aspect of the present invention are shown. As with the prior art device, the catalyst is rhodium-based. In contrast to the prior art $Al_2O_3$ device, the support 420 of the present invention is made from $Al_2O_3$ with $SiO_2$ added which, as previously mentioned, produces significant improvements in both the activity between the catalyst and the CO, as well as the temperature range where such selectivity is viable. As shown in the graph, the selectivity remains higher over a considerably broader temperature range than the support of FIG. 3. By way of example, the methanation reactor 400 of the present invention has a selectivity of over seventy percent up to temperatures of approximately 303 degrees Celsius, compared to only 292 degrees Celsius for the system of FIG. 3, and a selectivity over sixty percent up to approximately 322 degrees Celsius, compared to only 304 degrees Celsius for the system of FIG. 3, and a selectivity of over fifty percent up to temperatures up to 340 degrees Celsius compared to only up to approximately 312 degrees Celsius for the system of FIG. 3. This broader operating range is beneficial is when considered in light of the CO conversion shown on the graph, where dramatic improvements are shown relative to the prior art of FIG. 3. While the conversion rate of CO for the systems of FIGS. 3 and 4 are somewhat comparable at the higher support temperatures, the selectivity is higher for the support 420 of the present invention, especially in the temperature range where viable amounts of CO are being converted. Moreover, in the temperature regimes where the support of FIG. 3 does exhibit strong selectivity, the CO conversion is relatively poor compared to the support 420 of the present invention. For example, CO conversion rates are twice as high at the lower temperatures (250 degrees Celsius-260 degrees Celsius), and approach comparable equilibrium values (of around 1200 ppm) at considerably lower temperature (approximately 275 degrees Celsius compared to approximately 300 degrees Celsius for the system of FIG. 3). As an additional improvement, the equilibrium CO conversion rate plateaus rather than peaks, thus evidencing substantially temperature-independent behavior, thus affording a more steady, predictable performance with further ease of system integration. The higher CO conversion at the lower temperatures can be especially important in situations where the methanation reactor 400 is connected to the output of a water-gas shift reactor (not shown), where the desirable operating temperature is low to prevent the reverse water gas shift reaction. By having a catalyst in the methanation reactor 400 that is capable of operating at these lower water-gas shift temperatures, additional thermal matching devices and methods are avoided. Not only is the temperature environment better-suited to integration with other clean-up equipment, its higher level of selectivity ensures that less $H_2$ is being consumed during the methanation process.

Figure 5:
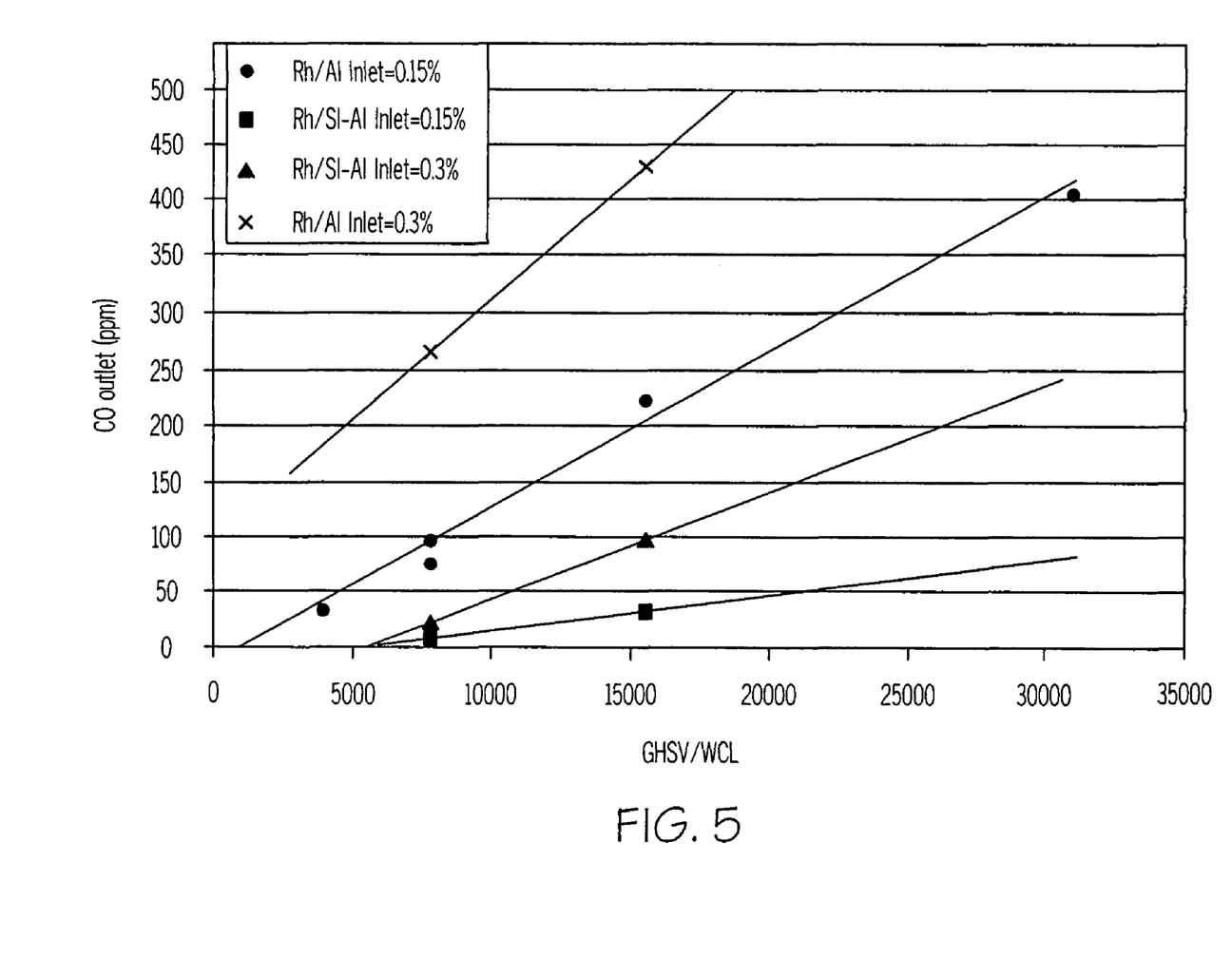
FIG. 5 shows a graph comparing the catalyst loading and inlet CO concentration on the outlet CO concentration.

Referring next to FIG. 5, the effects of reformate stream space velocity and rhodium loading are compared for the $SiO_2$-loaded $Al_2O_3$ support 420 of the present invention and the $Al_2O_3$ support of the prior art. As previously mentioned, too high of a CO methanation reaction temperature should be avoided, as such temperature can promote the water-gas shift reaction in the reverse direction such that $H_2$ is consumed while CO is produced. To that end, the space velocity can be tailored to the methanation reactor 400 to ensure temperature compatibility. As can be seen from the graph, the higher space velocities result in higher CO outlet concentrations. In situations involving catalysts deposited onto the support through a washcoat, it is preferable to avoid highly loaded (i.e., thicker) washcoat configurations. This is especially so where the catalyst is to be used under higher gaseous hourly space velocities (GHSVs) per washcoat loading (WCL), which is effectively the equivalent flowrate per unit weight of catalyst. Higher washcoat loadings inhibit reactant and product diffusion and consequent CO conversion; thinner washcoats, while conducive to lower pressure drop and consequent improved diffusion through the catalyst, must not be so lightly loaded that insufficient catalyst activity arises. By using the GHSV against the WCL, tests done with different flow rates of gas and different amounts of catalyst on the substrate can be normalized. The graph shows that under all sets of conditions the rhodium catalyst deposited on the $SiO_2$-coated $Al_2O_3$ support gives lower CO outlet concentration than the rhodium catalyst deposited on the $Al_2O_3$ support. As the GHSV rises, the CO outlet concentration increases, but less so for the rhodium catalyst deposited on the $SiO_2$-coated $Al_2O_3$ support.

Referring next to FIG. 6 in conjunction with FIG. 1, a vehicle 1000 incorporating a fuel cell system according to the present invention is shown. Fuel cell 500 is fluidly coupled to a fuel cell processing system 900 that includes reformer 200, supplemental CO clean-up device 300 and reactor 400. Fuel processing system 900 accepts fuel and an oxidant (such as oxygen) from respective fuel and oxygen supplies 100A and 100B and prepares the fuel for consumption in fuel cell 500. While the vehicle 1000 is shown notionally as a car, it will be appreciated by those skilled in the art that the use of fuel cell systems in other vehicular forms is also within the scope of the present invention.

While certain representative embodiments and details have been shown for purposes of illustrating the invention, it will be apparent to those skilled in the art that various changes may be made without departing from the scope of the invention, which is defined in the appended claims.

What is claimed is:

1. A method of delivering fuel to a fuel cell system, said method comprising:
   providing a fuel processing system comprising:
      a reformer to evaporate a mixture of fuel and oxygen coming from said fuel delivery system; and
      a single stage methanation reactor for removal of carbon monoxide from a reformate stream produced by said reformer, said reactor comprising:
         a porous ceramic support comprising alumina having silica dispersed on a surface of the alumina, said porous ceramic support having a surface acidity greater than that of alumina alone; and
         a noble metal catalyst coupled to said support, said noble metal selected from rhodium and ruthenium;
   introducing fuel and oxygen to said fuel processing system to create a fuel-oxygen mixture;
   heating said fuel-oxygen mixture in said reformer to produce said reformate stream containing CO, $CO_2$, $H_2O$, and $H_2$;
   introducing said reformate stream into said reactor;
   methanating said CO in said reactor at a temperature in a range of about 280° C. to about 340° C., said methanation having a selectivity of over 50% at a temperature of up to 340° C., and a CO conversion rate of about 30% at a temperature in a range of about 275° C. to about 300° C. to form a stream having a reduced CO level; and
   transporting said stream having said reduced CO level to said fuel cell.

2. A method according to claim 1, wherein said noble metal is rhodium.

3. The method of claim 1, wherein the temperature below which carbon monoxide conversion is less than about 1200 ppm is about 275 degrees Celsius.

4. The method of claim 3, whereupon attainment of about 1200 ppm carbon monoxide conversion, the portion of said reformate stream being delivered to the fuel cell comprises a carbon monoxide content of less than 10 ppm.

5. The method of claim 1, wherein said support temperature configured to be operated at least 250 degrees Celsius is operated at a temperature of between 270 degrees Celsius and 340 degrees Celsius.

6. The method of claim 1, wherein said hydrogen is present in said reformate stream prior to said reaction.

7. The method of claim 1, wherein said receiving said reformate stream into said flowpath comprises receiving said reformate stream from a reformer.

8. The method of claim 7, wherein said reformer comprises a steam reformer.

9. The method of claim 7, wherein said reformer comprises a partial oxidation reformer.

10. The method of claim 7, wherein said reformer comprises an autothermal reformer.

11. The method of claim 7, wherein said receiving said reformate stream into said flowpath comprises receiving said reformate stream from a water gas shift reactor.

12. The method of claim 7, wherein said receiving said reformate stream into said flowpath comprises receiving said reformate stream from a reformer and a water gas shift reactor.

13. The method of claim 7, further comprising sending said reformate stream to a fuel cell.

* * * * *